United States Patent
Di Modugno

(10) Patent No.: US 8,469,417 B2
(45) Date of Patent: Jun. 25, 2013

(54) BUMPER STRUCTURE

(75) Inventor: Francesca Di Modugno, Missaglia (IT)

(73) Assignee: Svimar S.R.L.-Societa' Per Lo Sviluppo Del Marketing E Della Ricerca, Torino (TO) (IT)

( * ) Notice: Subject to any disclaimer, the term of this patent is extended or adjusted under 35 U.S.C. 154(b) by 0 days.

(21) Appl. No.: 13/259,169

(22) PCT Filed: Mar. 22, 2010

(86) PCT No.: PCT/IB2010/051238
§ 371 (c)(1),
(2), (4) Date: Sep. 23, 2011

(87) PCT Pub. No.: WO2010/109405
PCT Pub. Date: Sep. 30, 2010

(65) Prior Publication Data
US 2012/0146348 A1 Jun. 14, 2012

(30) Foreign Application Priority Data
Mar. 26, 2009 (IT) .............................. MI2009A0471

(51) Int. Cl.
*B60R 19/34* (2006.01)
(52) U.S. Cl.
USPC ...................................................... 293/133
(58) Field of Classification Search
USPC ....... 293/132, 133, 134, 135, 155; 296/187.2, 296/187.09
See application file for complete search history.

(56) References Cited

U.S. PATENT DOCUMENTS

| | | | | |
|---|---|---|---|---|
| 5,150,935 | A * | 9/1992 | Glance et al. | 293/136 |
| 6,270,131 | B1 * | 8/2001 | Martinez et al. | 293/132 |
| 6,299,227 | B1 * | 10/2001 | Kroning et al. | 293/132 |
| 6,312,028 | B1 * | 11/2001 | Wilkosz | 293/133 |
| 8,002,338 | B2 * | 8/2011 | Yasuhara et al. | 296/203.02 |
| 2002/0043809 | A1 * | 4/2002 | Vismara | 293/133 |
| 2004/0084820 | A1 | 5/2004 | Kato et al. | |
| 2006/0043744 | A1 * | 3/2006 | Iketo et al. | 293/132 |
| 2006/0181090 | A1 | 8/2006 | Boivin et al. | |
| 2009/0085373 | A1 * | 4/2009 | Terada et al. | 296/187.09 |

FOREIGN PATENT DOCUMENTS

| | | |
|---|---|---|
| EP | 1 473 197 A1 | 11/2004 |
| GB | 2 422 136 A | 7/2006 |
| JP | 2007-302200 A | 11/2007 |
| JP | 2008-120256 A | 5/2008 |

OTHER PUBLICATIONS

International Search Report, dated May 19, 2010, from corresponding PCT application.

* cited by examiner

*Primary Examiner* — Glenn Dayoan
*Assistant Examiner* — Pinel Romain
(74) *Attorney, Agent, or Firm* — Young & Thompson

(57) ABSTRACT

Bumper structure 10 for a motor vehicle includes at least two polymeric crash boxes 30 having preferably an alveolar structure, and including a cross member 20 which extends between the at least two polymeric crash boxes 30, in which the cross member 20 is a metallic cross member 20. The bumper structure 10 includes connection elements 40 which extend between the metallic cross member 20 and a frame of the motor vehicle, and besides which are positioned in proximity of the at least two polymeric crash boxes 30. The connection elements 40 are plastically deformable and are unable to resist to compression stresses avoiding advantageously to transmit the compression stresses to the frame.

18 Claims, 7 Drawing Sheets

BUMPER STRUCTURE

The present invention refers to a bumper structure in particular for a transport means which for example a motor vehicle.

The present invention refers to a type of bumper structure having at least two polymeric crash boxes.

The bumper structures known having at least two polymeric crash boxes comprise besides a polymeric cross member that extends between the same, and besides comprise a polymeric external bumper covering having only an aesthetic function which cover said polymeric cross member and said at least two polymeric crash boxes.

The polymeric crash boxes show in particular a substantially alveolar structure which permit to absorb a portion of kinetic energy due to a crash of the motor vehicle against an obstacle fixed or mobile.

Each polymeric crash box is positioned between said polymeric cross member and a frame of said motor vehicle in such a way to absorb a part of the kinetic energy during said crash, consequently reducing the kinetic energy transferred to said frame.

Each polymeric crash box shows a first frontal extremity which stand for first the crash, and a second rear extremity, which is constrained to said frame of the vehicle.

Each polymeric crash box is in fact designed for having in case of crash a permanent plastic deformation and a programmed collapse starting from a frontal portion towards a second rear portion of the same, consequently determining a plurality of folding starting from said frontal portion towards said second rear portion.

A disadvantage of the polymeric crash boxes is that, in the case of a big crash often they break, transferring only a little part of said crash to the polymeric crash boxes and besides compromising also their stability.

Besides in particular in the case of a crash force angled respect to the first frontal extremity, a breaking of said polymeric cross member often determines a sudden failure of the rear portion of the polymeric crash boxes and a consequent deformation starting from the same rear portion, compromising the correct working during the same crash of the polymeric crash boxes.

Another disadvantages is that in the case of a failure of the polymeric cross member it compromise a correct stress of the crash boxes and consequently also its correct working.

A further disadvantage of the polymeric cross members is that being constrained to said frame they transfer to the same the compression stresses associated to the same crash.

Purpose of the present invention is that to realize a bumper structure for a motor vehicle that in the case of a crash it can be able to maximize the absorbing capacity a crash of a plurality of polymeric crash boxes, and that at the same time can be able to limit the most as possible the transfer of said crash to a frame of the vehicle.

Still another purpose is that to realize a bumper structure for a motor vehicle that can permit to use a collapsing capacity of each polymeric crash box during its crushing due to a crash and that at the same time reduce at the minimum the probability of a collapse starting from a rear portion of each same crash box.

Still another purpose is that to realize a bumper structure for a motor vehicle that can be able to absorb forces angled respect to a longitudinal direction of said vehicle, reducing at the minimum the probability of a collapse starting from a rear portion of the same polymeric crash box.

Still another purpose is that to realize a bumper structure for a motor vehicle having an improved stability and a greater absorbing capacity of a crash.

Further purpose is that to realize a bumper structure for a motor vehicle that can be easy to realize and that can be economically advantageous.

These purposes according to the present invention are reached realizing a bumper structure according to claim 1.

Further features of the invention are pointed out in the following claims.

The features and the advantages of a bumper structure according to the present invention will appear more evident from the following illustrative and not limitative description, referred to the attached schematic drawings in which.

Figure 1:
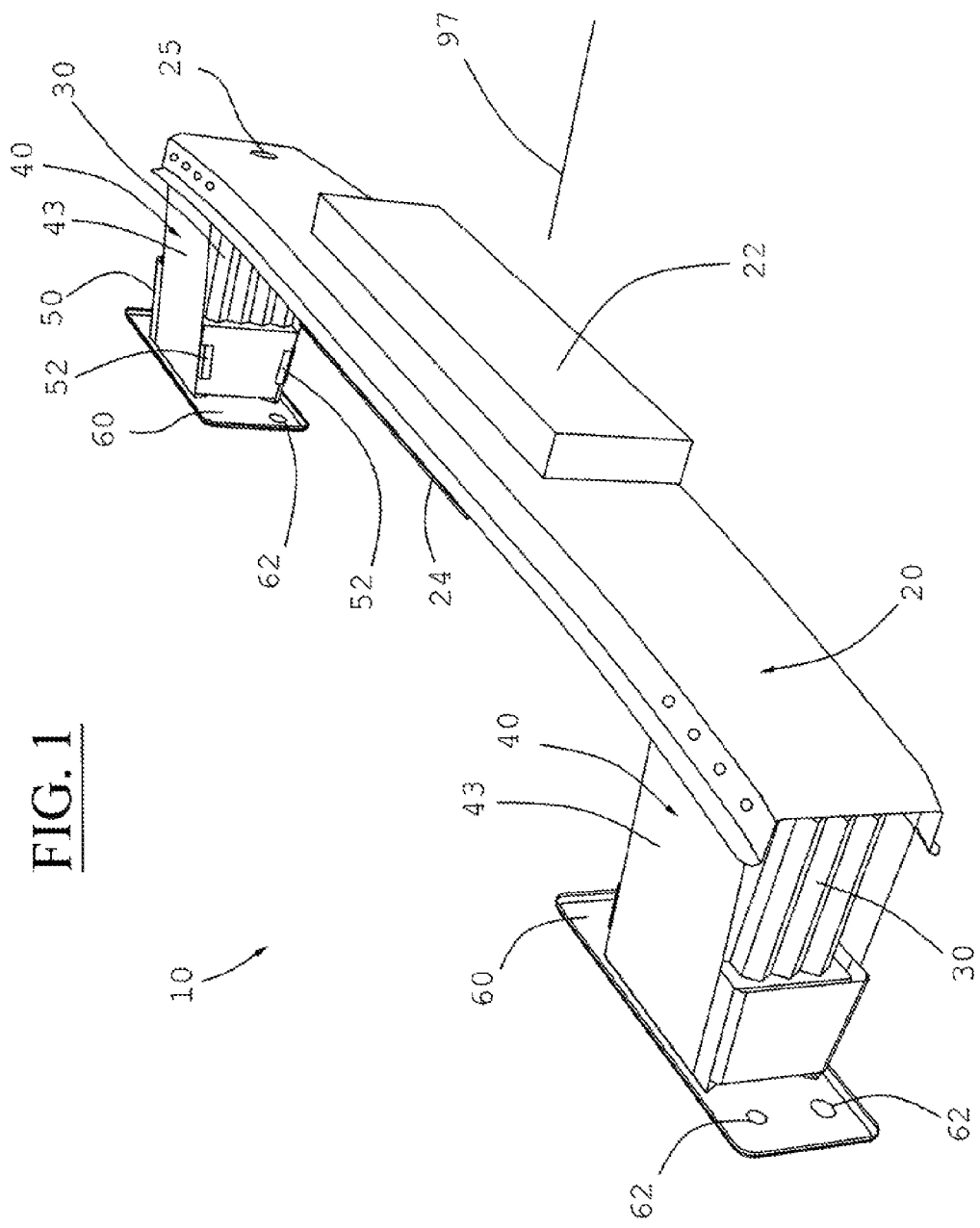
FIG. 1 is a raised lateral left perspective top side frontal view of a preferred form of embodiment of a bumper structure according to the present invention.
Figure 2:
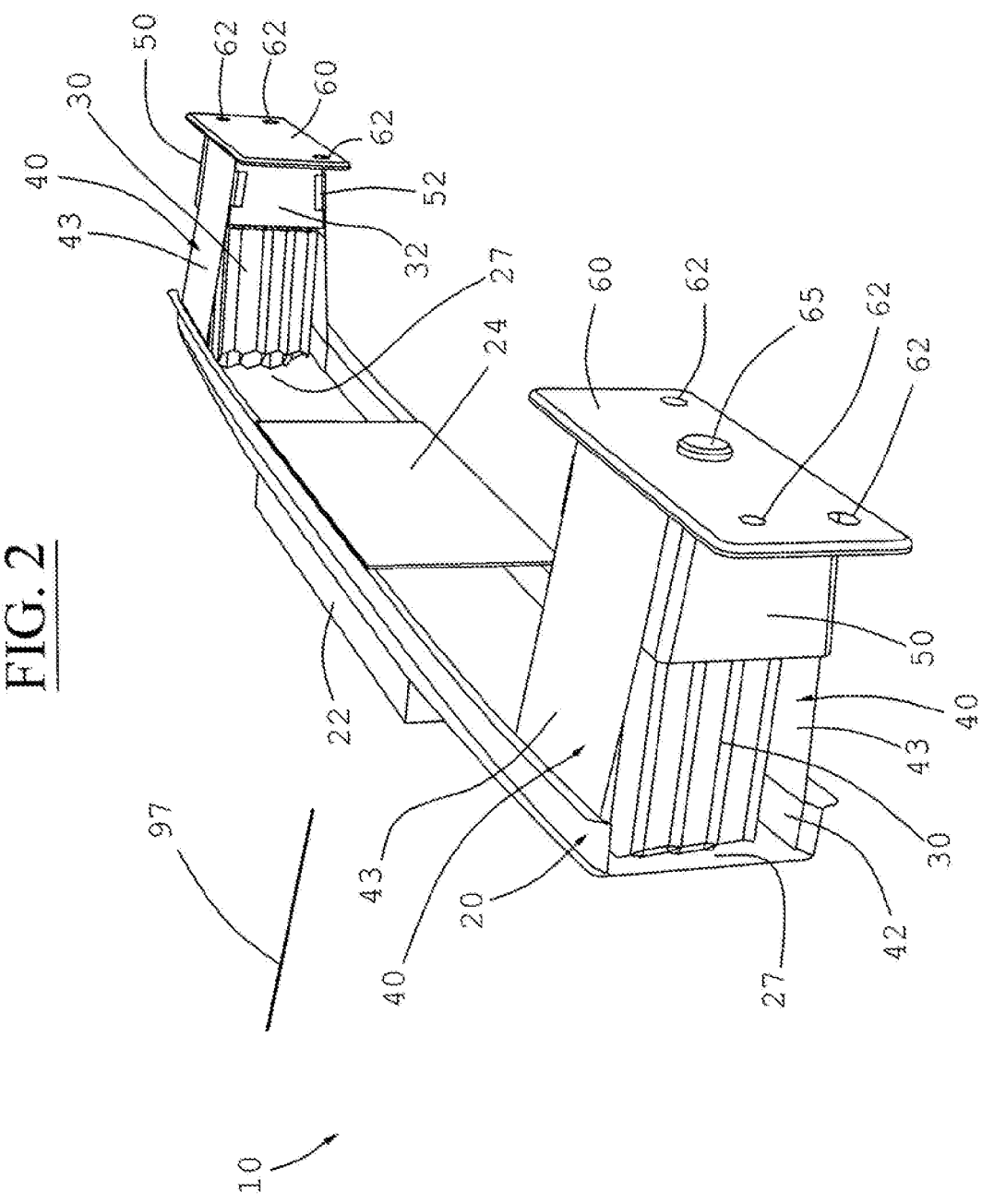
FIG. 2 is a raised lateral right perspective top side rear view of the bumper structure of FIG. 1.
Figure 3:
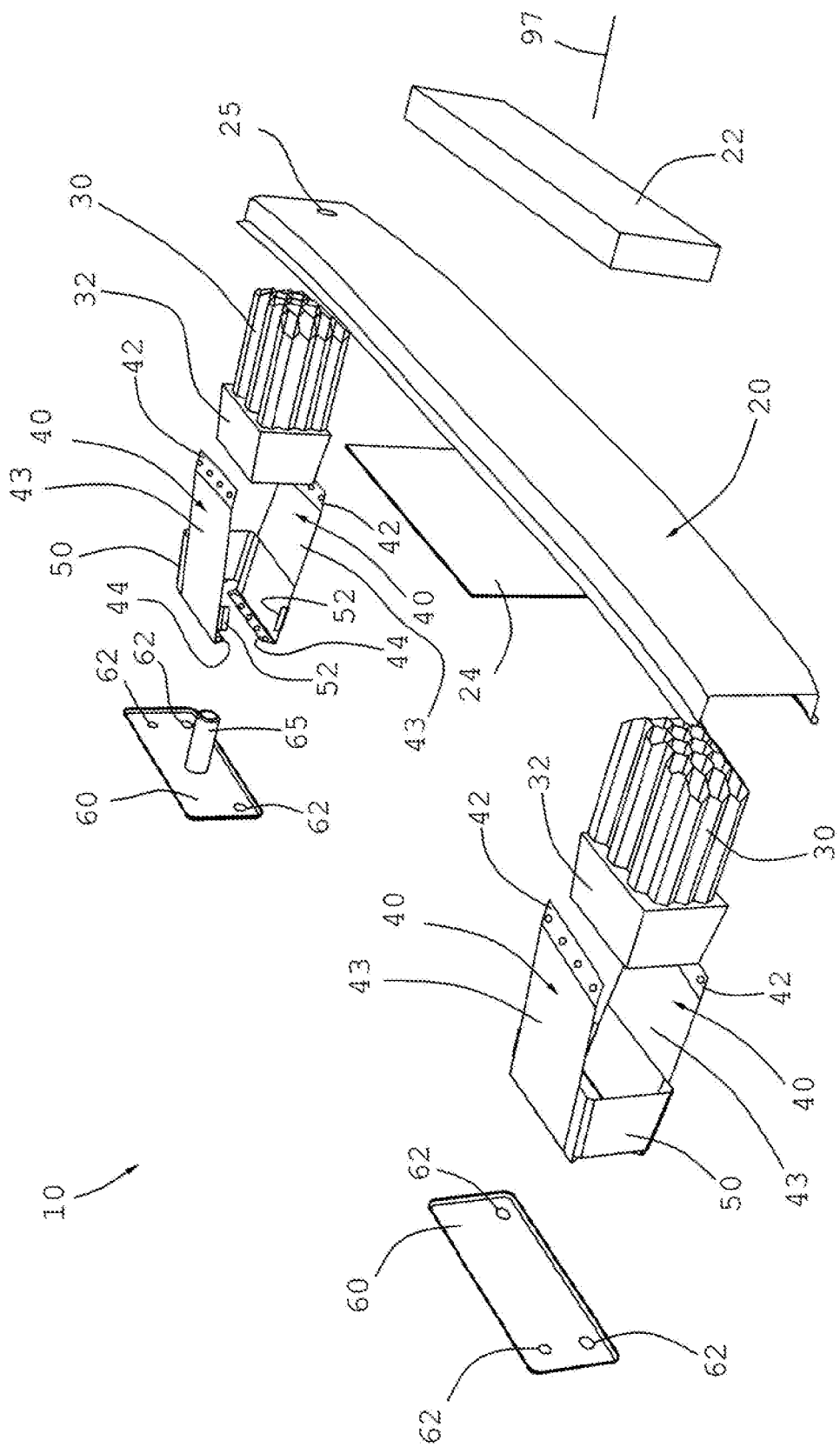
FIG. 3 is a exploded perspective view of a preferred form of embodiment of a bumper structure according the present invention.
Figure 4:
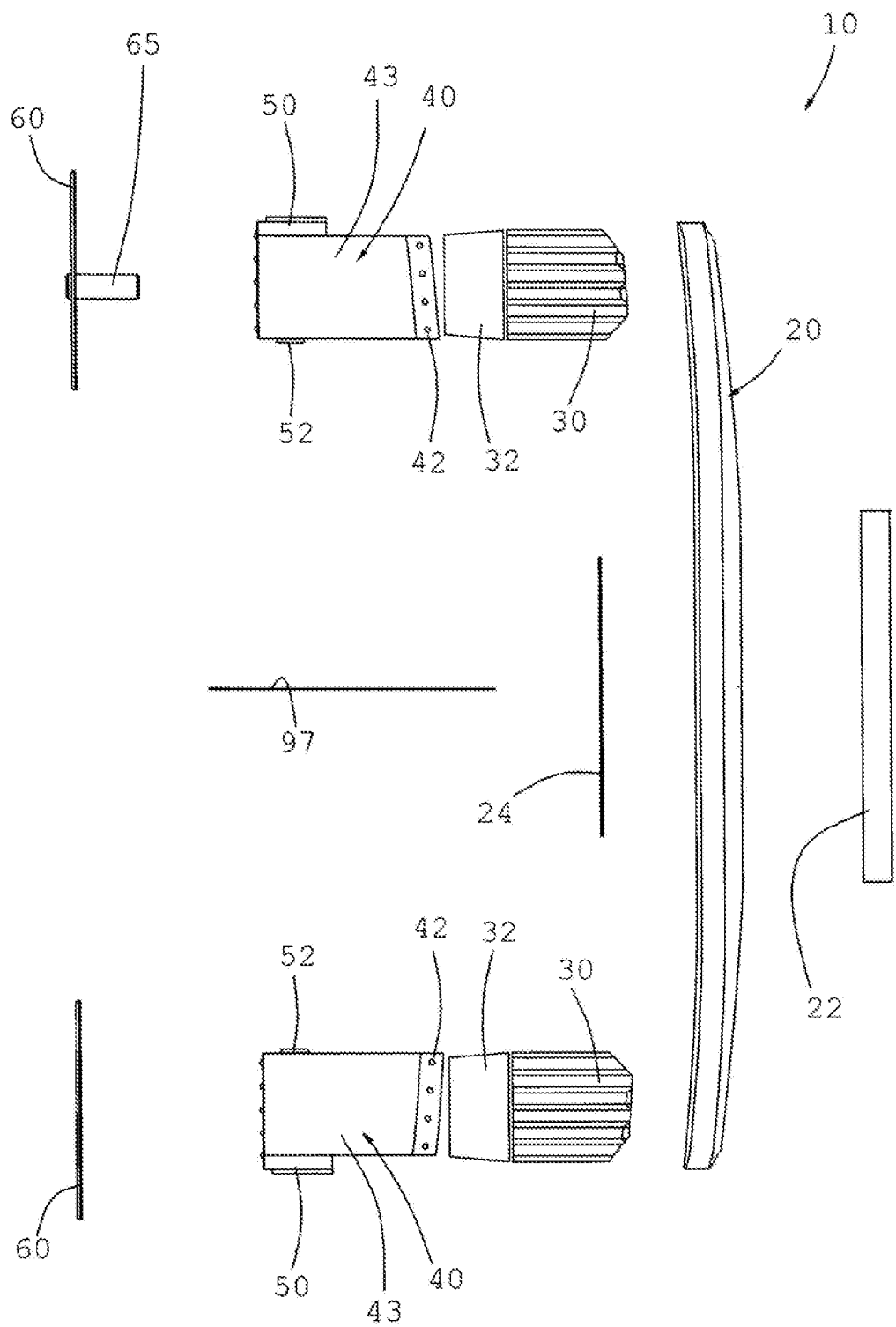
FIG. 4 is an exploded top view of the bumper structure of FIG. 3.
Figure 5:
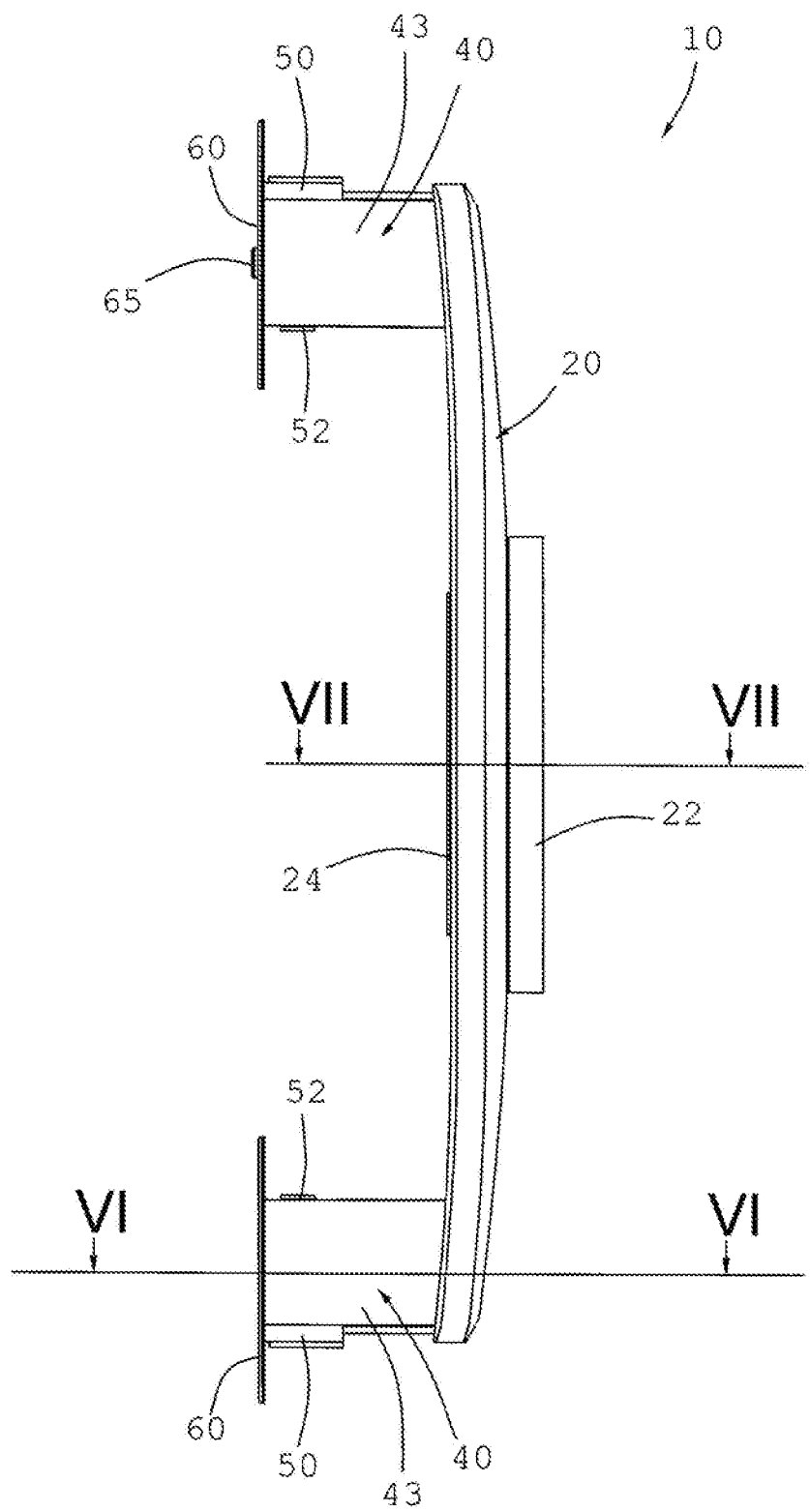
FIG. 5 is a schematic top view of a preferred form of embodiment of a bumper structure according the present invention.
Figure 6:
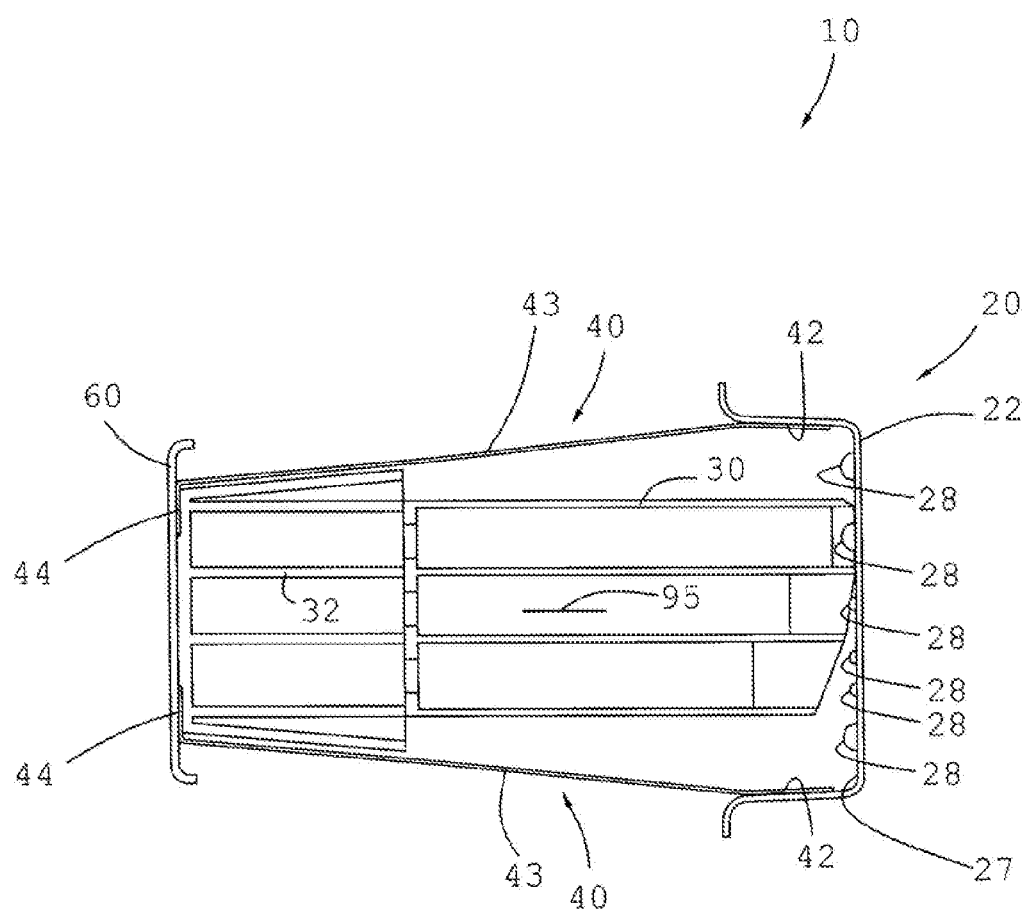
FIG. 6 is a raised lateral left perspective sectioned view of the bumper structure of FIG. 5 sectioned along the line VI-VI.
Figure 7:
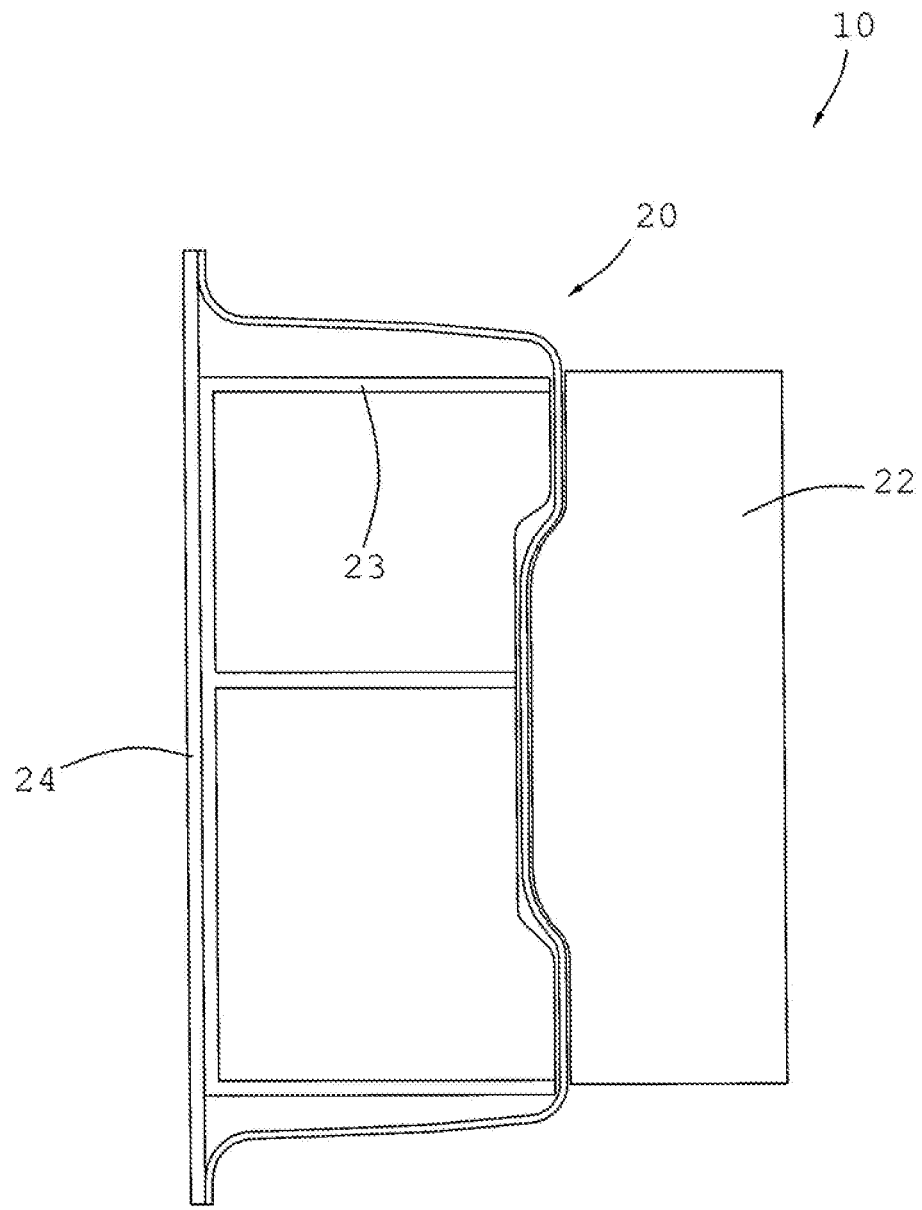
FIG. 7 is a raised lateral left perspective sectioned view of the bumper structure of FIG. 5 sectioned along the line VII-VII.

With reference to the figures, it is shown a bumper structure 10 for a motor vehicle comprising at least two polymeric crash boxes 30 having preferably an alveolar structure, and comprising a cross member which extends between said at least two polymeric crash boxes 30.

According to the present invention said cross member is a metallic cross member 20 and it is able to resist to a compression force greater than 60000 N, in particular greater than 80000 N, applied along a longitudinal direction 97 of said motor vehicle, besides said bumper structure 10 comprises connection means 40 which extend between said metallic cross member 20 and a frame of said motor vehicle, and besides which are positioned preferably in proximity of said at least two polymeric crash boxes 30.

Said connection means 40 are plastically deformable under compression with a compression force greater than 500 N, and in particular greater than 1000 N, applied along said longitudinal direction 97, avoiding advantageously therefore to transmit said compression stresses to said frame.

Consequently in the case of a crash said connection means 40 not being able to resist to compression stresses and/or to bending stresses, they deform plastically, in particular bending and reducing their length, substantially about without absorbing energy.

This permit to avoid the direct transmission of the crash from said metallic cross member 20 to said frame, before that the same crash was in part absorbed by said at least two polymeric crash boxes 30.

Advantageously this permit to avoid consequently the transfer the same crash also to one or more passengers of the motor vehicle before that the same crash was at least in part absorbed, avoiding or reducing drastically possible damages or wounds to the same passengers of the motor vehicle in the case of a posterior crash, and guaranteeing a greater security level of the same motor vehicle.

In fact in this way the crash is never transferred directly from said metallic cross member 20 to said frame, because said connection means 40 being perfectly weak at compression also for little compression forces, bending them-self instantly they permit to obtain an instantaneous stress of said at least two polymeric crash boxes 30, which absorb a part of the kinetic energy of the crash, transferring to the frame only an force and an acceleration reduced respect to the same in the first instant of the crash.

Besides said metallic cross member 20 being realized in a metallic material is able to resist to a big crash, and besides it is advantageously able to transfer said crash to at least a polymeric crash box 30 of said at least two polymeric crash boxes 30, maximizing consequently the absorbing capacity of said crash and reducing at the minimum the energy transferred to said frame by means of said at least two polymeric crash boxes 30.

Besides said plastically deformable connection means 40 are able to cooperate with said metallic cross member 20 in such a way to permit a programmed compression and a correct alignment of at least a polymeric crash box 30 respect to a direction of said crash, reducing at the minimum the kinetic energy of said crash that is transferred to said frame.

On the contrary with elastic element, in particular coupled and shaped as a crossbow, which act therefore as a spring, being much stiffen would transfer to said frame however a part of the crash before that the polymeric crash boxes 30 are stressed, compromising the stability and the functionality of the same in the case of an angled crash because an elastic deformation would determine a failure or a programmed deformation starting from a rear portion of the same.

Preferably said connection means 40 preferably metallic comprise a plurality of elements 40, in particular tie rod elements 40, which act as tie rods or tension wire, each element 40 results constrained to its extremities respectively to said metallic cross member 20 and to said frame, and shows a ratio between an its length and an its cross section which is greater than 0.5 and in particular greater than 3, in such a way to not be able to support compression stresses.

For tie rod element 40 it is intended a tie rod or a tension wire or a plate or foil acting as a tie rod.

Preferably each tie rod element 40 preferably metallic is a tie rod or a tension wire or a plate or foil acting as a tie rod.

Preferably said connection means 40 comprise a plurality of couples of tie rod elements 40 preferably metallic, in which each tie rod element 40 shows a first extremity 42 fixed or made integral to said metallic cross member 20 and besides shows a second extremity 44 constrained to said frame.

In particular the tie rod elements 40 of each couple of tie rod elements 40, and in particular a plurality of their free central portions 43 preferably substantially flat, respect to a longitudinal axis 97 of said vehicle they result substantially convergent going towards said second extremity 44, or in other terms going towards said frame.

Advantageously in this way they result also more weak under compression, and besides each tie rod having preferably a free central portion 43 substantially flat it is able to stabilize said metallic cross member 20 in particular in the case of an angled crash.

In particular each couple of tie rod elements 40 is positioned in proximity of a correspondent crash box 30 in such a way to cooperate with said metallic cross member 20 in order to stress preferably said correspondent crash box 30 substantially with only a stress compression in such a way to maximize the absorbing capacity of the crash of said correspondent crash box 30.

Preferably each couple of tie rod elements 40 is plastically deformable under compression with a compression force having a value greater than 250 N, and in particular greater than 500 N, applied along said longitudinal direction 97.

Each tie rod element 40 act substantially as a tie rod or as a tension wire, in such a way to avoid to transfer compression forces to said frame and at the same time it is able to resist only to tensile forces in such a way to permit advantageously to draw said motor vehicle and in such a way to stabilize said metallic cross member 20 in case of an angled crash.

Preferably each tie rod element 40 is realized in a metallic material as for example steel and/or its alloys, and in particular it is realized with a metallic material with low specific weight as for example aluminium and/or its alloys.

Preferably each tie rod element 40 is a metallic sheet in particular having a central portion 43 preferably substantially flat and a first and a second extremity 42 and 44 which are respectively constrained to said metallic cross member 20 and to said frame in such a way of not being able to support compression stresses, acting consequently substantially as a tie rod.

In particular each polymeric crash box 30 is positioned between the tie rod elements 40 preferably of a correspondent couple of tie rod elements 40, advantageously in such a way to be maintained in a correct position during said crash.

Advantageously in this way said metallic cross member 20 cooperating with at least a couple of tie rod elements 40 is able to maintain correctly aligned at least a correspondent polymeric crash box 30 respect to a crash force associated to said crash, during its plastic deformation.

Said bumper structure 10 comprise preferably at least two housings 50 preferably metallic of said at least two polymeric crash boxes 30, in such a way to maintain the same correctly positioned in case of a crash.

Preferably said connection means 40 preferably metallic are constrained and/or made integral to said at least two housings 50 preferably metallic.

Each housing 50 preferably metallic is in particular open from a side in such a way to permit the insertion of a correspondent polymeric crash box 30, and besides preferably comprises at least a bendable lateral portion 52 for constrain sideways and maintain in position said correspondent polymeric crash box 30.

Said bumper structure 10 comprises in particular at least two fixing plates 60 preferably metallic provided in particular of at least a through hole 62 for fixing to said frame and/or for fixing a pin 65 for a hook, each fixing plate 60 is preferably made integral to a correspondent housing 50 and/or to said connection means 40.

Preferably according to a preferred form of embodiment each couple of tie rod elements 40 is constrained and/or made integral to a correspondent housing 50 and/or to a correspondent fixing plate 60, advantageously in such a way to transport and assembling easily said metallic cross member 20.

Preferably according to a preferred form of embodiment said metallic cross member 20 comprises at least an internal portion 27 which face in proximity of at least a polymeric crash box 30 and which is preferably provided of a rough surface, in particular with high friction, and/or which is provided of a plurality of protuberances 28 or micro protuberances in such a way to avoid in case of a crash a relative movement respect to said metallic cross member 20 along a direction substantially orthogonal to a longitudinal axis 95 of each polymeric crash box 30.

Advantageously during a crash this permit a greater stability of each polymeric crash box 30, reducing at the minimum the possibility that it determines collapses or folding starting from a rear extremity of the same, and at the same time without reduce the crash absorbing capacity of the same polymeric crash box 30.

Preferably according to a preferred form of embodiment said metallic cross member 30 comprises at least a polymeric stiffening element 23 closed into the same by means at least a correspondent element 24 preferably metallic and besides said metallic cross member 20 preferably comprises at least an element 22 formed with a polymeric foam which is fixed or constrained externally to said metallic cross member 20.

Advantageously this permit to stiffen said metallic cross member 20 maintaining at the same time a reduced weight.

According to a preferred form of embodiment each polymeric crash box 30 shows a longitudinal axis 95 which respect to a longitudinal axis 97 of said vehicle forms an angle that in absolute value shows a value included between 0.01° and 20° and in particular included between 0.01° and 10°.

Advantageously in this way through each polymeric crash box 30 it is possible to absorb crash forces angled respect to a longitudinal direction 97 of said vehicle, because each polymeric crash box 30 is able to plastically deform itself also with transversal crash stresses.

Preferably each polymeric crash box 30 is made integral to a polymeric basal element 32 preferably alveolar which is preferably inserted into a correspondent housing 50.

Preferably each polymeric crash box 30 comprises a plurality of holes which are obtained in a rear portion of the same.

Preferably at least a polymeric crash box 30 comprises besides a substantially longitudinal through hole, for permitting the insertion of an hook usable in particular for draw a transport means, which is in particular results tapered preferably in proximity of a rear extremity of an angle preferably included between 0.01° and 4° and more preferably included between 0.01° and 2°.

This in such a way to avoid a collapse or a plurality of folding starting from a rear extremity.

Preferably said metallic cross member 20 comprises a through hole 25 for the insertion of said hook.

Preferably each polymeric crash box 30 is realized in just one piece, in particular through injection moulding, with a polymeric material with high impact strength, which with a test of the type ISO 180/1 A at 23° C. shows a breaking energy of at least 5 KJ/m$^2$ and in particular of at least 10 KJ/m$^2$, which is able to maintain its mechanical characteristics also after a thermal treatment for 2 hours to at least 160° C. and besides which in particular is a polymeric material preferably chosen between polymeric materials known with commercial terms Xenoy™ e Noryl™ and Noryl GTX™ and/or between polymeric materials having similar characteristics.

According to a further aspect of the present invention it is furnished a motor vehicle comprising a bumper structure 10 in particular rear of the type previously described and besides comprising a polymeric external bumper covering, not shown in the figures, having only an aesthetic function which cover said metallic cross member 20 and said at least two polymeric crash boxes 30.

In this way it has been seen that a bumper structure according to the present invention achieves the objectives previously mentioned.

The bumper structure of the present invention thus conceived can undergo to numerous modifications and variations, all included in the same inventive concept.

Furthermore, in practice the materials used, as well as their dimensions and the components, can vary according to the technical needs.

The invention claimed is:

1. A bumper structure (10) for a motor vehicle comprising:
at least two polymeric crash boxes (30);
a cross member which extends between said at least two polymeric crash boxes (30), wherein said cross member is a metallic cross member (20) adapted to support a compression force greater than 60000 N applied along a longitudinal direction (97) of said motor vehicle; and
connection means (40) which extend between said metallic cross member (20) and a frame of said motor vehicle, said connection means (40) being plastically deformable under compression with a compression force greater than 500 N applied along said longitudinal direction thereby avoiding transmitting said compression stresses to said frame,
wherein said metallic cross member (20) comprises at least an internal portion (27) that faces said at least two polymeric crash boxes (30) and has a plurality of protuberances (28).

2. The bumper structure (10) according to claim 1, wherein said connection means (40) comprise a plurality of tie rod elements (40) that are attached respectively to said metallic cross member (20) and to said frame.

3. The bumper structure (10) according to claim 1, wherein said connection means (40) comprise a plurality of couples of tie rod elements (40), in which each tie rod element (40) shows a first extremity (42) fixed or made integral to said metallic cross member (20) and a second extremity (44) constrained to said frame.

4. The bumper structure (10) according to claim 3, wherein tie rod elements (40) of each said couple of tie rod elements (40) have free central portions (43) that are substantially flat with respect to the longitudinal axis (97).

5. The bumper structure (10) according to claim 2, wherein each said tie rod element (40) is made of a metallic material.

6. The bumper structure (10) according to claim 2, wherein each said tie rod element (40) is a metallic sheet having a central portion (43) that is substantially flat and a first and a second extremity (42) and (44) which are respectively constrained to said metallic cross member (20) and to said frame.

7. The bumper structure (10) according to claim 2, wherein each said polymeric crash box (30) is positioned between two adjacent ones of said tie rod elements (40).

8. The bumper structure (10) according to claim 1, further comprising at least two housings (50) for said at least two polymeric crash boxes (30), and wherein said connection means (40) are constrained to said at least two housings (50).

9. The bumper structure (10) according to claim 8, wherein each said housing (50) is open from a side in such a way to permit insertion of a correspondent said polymeric crash box (30), and comprises at least a bendable lateral portion (52).

10. The bumper structure (10) according to claim 1, further comprising at least two fixing plates (60) provided with at least a through hole (62) for fixing to said frame.

11. The bumper structure (10) according to claim 1, wherein each said polymeric crash box (30) has a longitudinal axis (95) that is not aligned with the longitudinal axis (97) of said vehicle.

12. The bumper structure (10) according to claim 1, wherein at least one said polymeric crash box (30) comprises a substantially longitudinal through hole which is tapered.

13. The bumper structure (10) according to claim 1, wherein each said polymeric crash box (30) consists of just one piece of a polymeric material with high impact strength, which with a test of the type ISO 180/1 A at 23° C. shows a breaking energy of at least 5 KJ/m², which is able to maintain its mechanical characteristics after a thermal treatment for 2 hours to at least 160° C.

14. The bumper structure (10) according to claim 1, further comprising a polymeric external bumper covering having an aesthetic function and that covers said metallic cross member (20) and said at least two polymeric crash boxes (30).

15. The bumper structure (10) according to claim 2, wherein said connection means (40) comprise a plurality of couples of tie rod elements (40), in which each tie rod element (40) shows a first extremity (42) fixed or made integral to said metallic cross member (20) and a second extremity (44) constrained to said frame.

16. The bumper structure (10) according to claim 15, wherein tie rod elements (40) of each said couple of tie rod elements (40) have free central portions (43) that are substantially flat with respect to the longitudinal axis (97).

17. The bumper structure (10) according to claim 3, wherein each said tie rod element (40) is a metallic sheet having a central portion (43) that is substantially flat and a first and a second extremity (42) and (44) which are respectively constrained to said metallic cross member (20) and to said frame.

18. The bumper structure (10) according to claim 3, wherein each said polymeric crash box (30) is positioned between two adjacent ones of said tie rod elements (40).

\* \* \* \* \*